US008834038B2

(12) United States Patent
Limbert et al.

(10) Patent No.: US 8,834,038 B2
(45) Date of Patent: Sep. 16, 2014

(54) FIBER OPTIC CONNECTOR

(71) Applicant: Ridgemount Technologies Ltd., Oxfordshire (GB)

(72) Inventors: Mark John Limbert, Northamptonshire (GB); Christopher Russel Peters, Buckinghamshire (GB)

(73) Assignee: Ridgemount Technologies Ltd., Launton (GB)

( * ) Notice: Subject to any disclaimer, the term of this patent is extended or adjusted under 35 U.S.C. 154(b) by 27 days.

(21) Appl. No.: 13/678,686

(22) Filed: Nov. 16, 2012

(65) Prior Publication Data

US 2014/0056562 A1 Feb. 27, 2014

(30) Foreign Application Priority Data

Aug. 24, 2012 (EP) .................................... 12181763

(51) Int. Cl.
*G02B 6/36* (2006.01)
*G02B 6/38* (2006.01)
*G02B 6/42* (2006.01)

(52) U.S. Cl.
CPC ............... *G02B 6/36* (2013.01); *G02B 6/3878* (2013.01); *G02B 6/3879* (2013.01); *G02B 6/3825* (2013.01); *G02B 6/3893* (2013.01); *G02B 6/3831* (2013.01); *G02B 6/4246* (2013.01); *G02B 6/4292* (2013.01)

USPC .............................................. 385/77; 385/59

(58) Field of Classification Search
USPC ...................................................... 385/59, 77
See application file for complete search history.

(56) References Cited

U.S. PATENT DOCUMENTS

| 5,037,175 | A | 8/1991 | Weber |
| 7,373,031 | B2 * | 5/2008 | Wang et al. ..................... 385/14 |
| 7,785,018 | B2 * | 8/2010 | Jones et al. ..................... 385/73 |
| 2002/0168148 | A1 | 11/2002 | Gilliland et al. |
| 2009/0220198 | A1 | 9/2009 | Sheau Tung Wong et al. |

FOREIGN PATENT DOCUMENTS

| DE | 102011005792 | 9/2011 |
| EP | 0633485 | 1/1995 |
| EP | 0848267 | 6/1998 |
| GB | 2239104 | 6/1991 |
| WO | WO2011/073953 | 6/2011 |

* cited by examiner

*Primary Examiner* — Omar Rojas
(74) *Attorney, Agent, or Firm* — Gordon & Jacobson, PC

(57) ABSTRACT

A fiber optic connector arranged to be releasably connected to a fiber optic adaptor. The fiber optic connector includes a body configured to receive and terminate two optical fibers, and a latch mechanism provided on the body. The latch mechanism is configured for releasable engagement with each of two sockets of the fiber optic adaptor. The latch mechanism of the fiber optic connector is configured for actuation in a direction laterally across the body.

13 Claims, 11 Drawing Sheets

FIBER OPTIC CONNECTOR

BACKGROUND

1. Field

The present application relates to a fiber optic connector. The present application also relates to a fiber optic adaptor unit comprising a fiber optic adaptor and a fiber optic connector.

2. Related Art

Fiber optic connections such as patch cords and interconnects are known to be made with a standard LC (Lucent Technology) Connector incorporating a latch operating in a vertical plane. In use, the user actuates the connector by depressing the connector latch in a direction vertically towards the body to disengage the connector from a corresponding adaptor. Vertical action depressing the latch allows separation of the fiber optic connector from the adaptor.

SUMMARY

According to a first aspect of the present application, a fiber optic connector is provided that is releasably connected to a fiber optic adaptor. The fiber optic connector includes a body configured to receive and terminate two optical fibers and a latch mechanism provided on the body. The latch mechanism is configured for releasable engagement with each one of two sockets of the fiber optic adaptor. The latch mechanism is also configured for actuation in a direction laterally across the body.

The provision of a latch mechanism configured for releasable engagement and actuation in a direction laterally across the body allows the connector to latch in the horizontal plane. In high density applications connectors can be stacked one on another, making access to a vertical latch, and the disconnection of a connector from an adaptor, very difficult. Additional equipment to address the resulting inefficient stacking includes over-sleeves. Horizontal actuation of the latch mechanism allows freedom in the design of the cabling, configuration, density and number of overall connectors for example and in applications with a high density of cables and interconnects the release mechanism for the latch is accessible with ease.

LC connectors are available as a single or simplex version. The fiber optic connector in an embodiment of the present application comprises two simplex units held together with a brace or clamp. In this configuration, the fiber optic connector is arranged to receive and terminate two optical fibers. The brace component creates a duplex unit at a desired pitch. The body of the fiber optic connector of the present application can be defined to include a single element duplex connector and the arrangement comprising single units in a braced pair.

In an embodiment, the latch mechanism comprises a pair of latch members, each latch member configured to releasably engage with one side of a respective socket of the fiber optic adaptor. This allows for secure connection using the minimum number of parts of the fiber optic adaptor. The other side(s) of each respective socket of the fiber optic adaptor remains unused in the latching and is available, with other portions of the fiber optic connector, for securing or stabilization functions. Outer sides or shoulders of the fiber optic adaptor are preferably used for making the latch and connection.

In an embodiment, each latch member comprises a retention face arranged to cooperate with a portion of a keyway of a respective adaptor socket.

This means that in an embodiment the latch mechanism is urged into the standard shaped keyway of an adaptor cavity and can cooperate with a portion of the keyway of the adaptor socket so that the shaped retention face can latch and engage with a portion of the keyway. This allows efficient latching with a minimum number of parts and enables use by and with using existing LC connectors.

In an embodiment, a fiber optic connector further comprises a location member provided between the pair of latch members. The location member is arranged to engage with a central portion of the fiber optic adaptor between the sockets of the fiber optic adaptor, to thereby locate and retain the connector engagement with the adaptor. In this way, the central portion of the fiber optic adaptor between the adaptor sockets acts as a location feature and provides a way of achieving accurate placement of the adaptor with the connector. The location member prevents rotation of the horizontal latch and connector body relative to the adaptor. The rigidity of the central portion of the connector is utilized to improve the overall stability and rigidity of the connector body. Additional shaped protrusions at other positions on the connector can be used to further support and locate the connector with the adaptor, in particular within a corresponding portion of the keyway of the adaptor.

In an embodiment, each latch member comprises an arm having a generally curved shape, the arms being arranged to curve generally towards one another, each arm being tapered to finish at a retention face. The tapered arms and curved shape are convenient for user actuation and manipulation. In an embodiment latch members are arranged to flex towards each other under the action of a lateral force and a retention face of each latch member is configured to be urged out of contact with a portion of a keyway of a respective adaptor socket under the action of a lateral force. The action and movement of the latch members can be controlled by force applied by a user.

In an embodiment, a fiber optic connector latch mechanism is releasably mountable on each of two opposing faces of the connector body. A transceiver device enables transmit and receive signals to be passed to and from the same device with a two port connection interface in an optical network. Where multiple connection points are present in the network a requirement to switch or cross-connect polarity of the connector ports can be met with the present connector by fitting the connector latch mechanism to either the bottom or to the top of the connector body. This results in the switch of the fiber ports of the connector without requiring a separate specific replacement patch cord connector; either straight (non-crossed) patch cord or crossed patch cord. This feature allows ease of conversion of a crossed polarity patch cord to a straight patch cord in optical networks.

The latch mechanism of a further embodiment further comprises a mounting spigot including one or more anti-rotation side flanges, the mounting spigot and the side flanges are configured for selectable location in first and second mounting sockets provided in the said two faces of the connector body, the mounting spigot and the said flange being configured to engage with the respective mounting socket to secure the latch mechanism to the connector body and hinder rotation of the connector.

In this arrangement the adaptor and connector are protected from rotation and external torque from optical fiber so the mounting and anti-rotation features this arrangement can add rigidity to the connector and adaptor package.

In an embodiment the latch mechanism is further configured for actuation in a direction towards the connector body, the latch mechanism being moveable between an engagement position at a first separation from the connector body and a release position at a second, smaller separation from the connector body in which the latch mechanism is disengaged from the adaptor sockets. The vertical movement of the latch mechanism provides an alternative disengagement technique and can be useful in space limited applications and situations.

The removal and relatching of connectors during maintenance and reconfiguration becomes a simple servicing operation requiring servicing personnel to carry minimal tools or equipment.

The latch mechanism of the embodiment is mounted on a resilient member for movement between engaged and released positions. In particular, this allows the user to latch the adaptor within the connector in a floating free position raised above the connector body and to compress the latch in a vertical plane to disengage the adaptor from the connector. This can mean fewer latching parts and components.

According to a second aspect of the present application, there is provided a fiber optic adaptor unit comprising a fiber optic adaptor having first and second adaptor sockets and a fiber optic connector as described above.

Embodiments of the application will now be described in detail, by way of example only, with reference to the accompanying drawings.

BRIEF DESCRIPTION OF THE DRAWINGS

FIG. 9b is a detailed mounted view of the connector and latch mechanism of FIG. 9a.

DETAILED DESCRIPTION OF THE PREFERRED EMBODIMENTS

Figure 1:
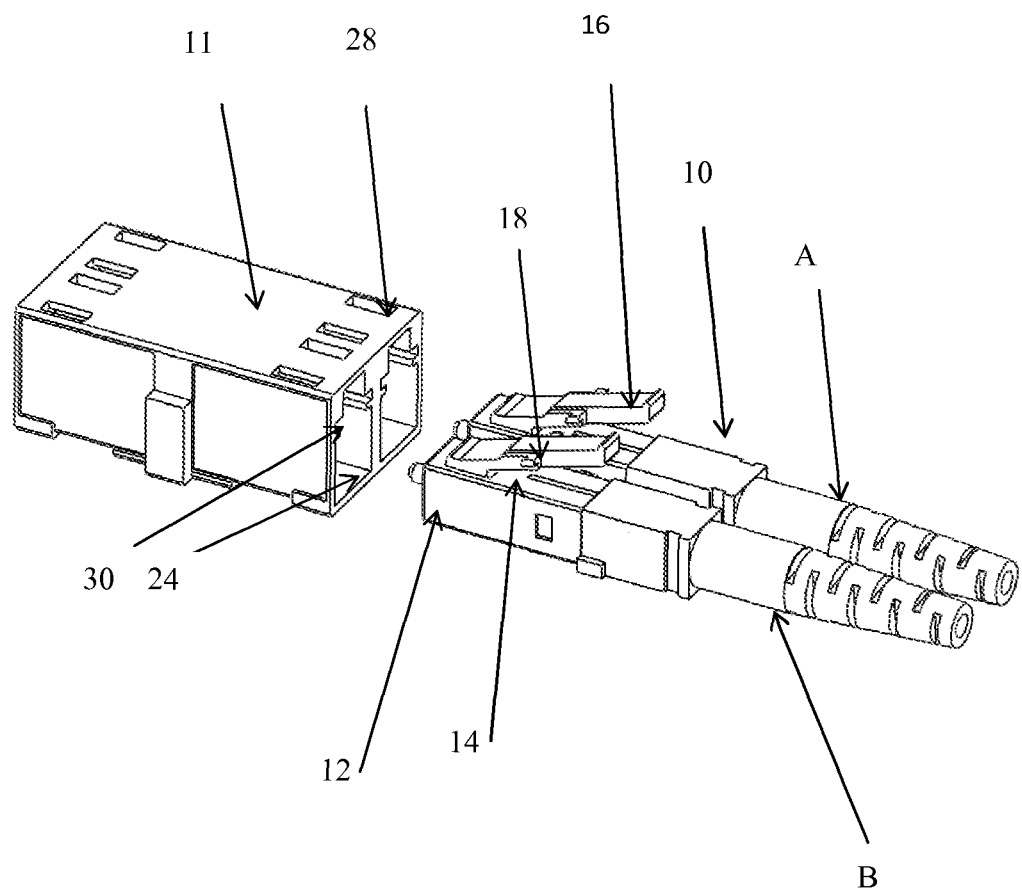
FIG. 1 is a perspective view of an existing known coupling mechanism for a fiber optic connector and an adaptor, shown prior to connection.
Figure 2:
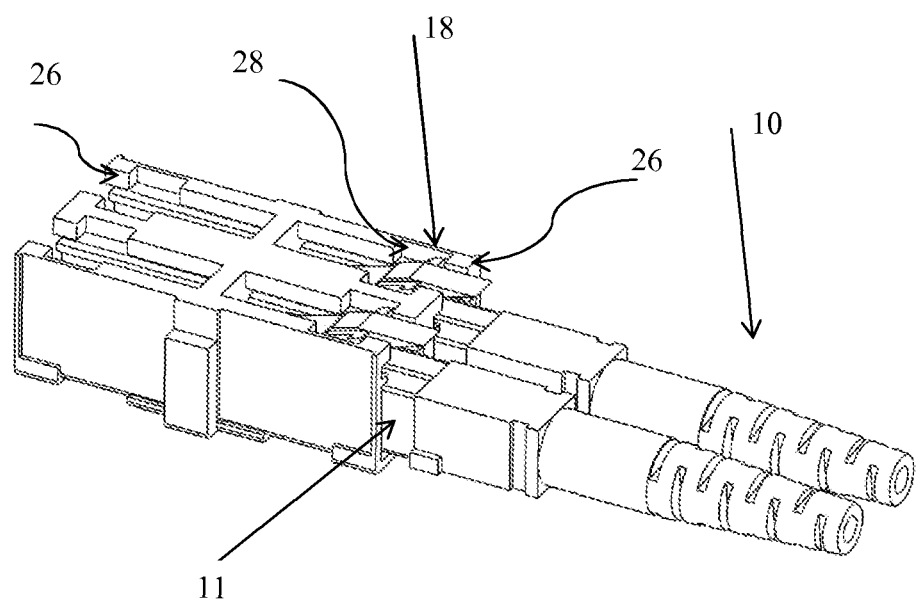
FIG. 2 is a perspective, partial cut away view of an existing known coupling mechanism for a fiber optic connector and an adaptor, shown with the connector latched and connected to the adaptor.

Referring now to FIGS. 1 and 2, there is shown an LC connector 10. The connector 10 comprises an elongate body 12 configured to receive and terminate two optical fibers A, B, and a latch mechanism 14. The latch mechanism 14 comprises a latch arm 16, mounted on an upper surface and at the connection end of the body 12. The latch arm 16 is sprung or biased away from the body 12 in a vertical direction. Each latch arm 16 includes a pair of latch retention lugs 18 extending laterally either side of each of the arms 16. The adaptor 11 to which the connector 10 is to be mated comprises an elongate body 22 bounding an opening 24. The opening 24 corresponds in size and shape to a connector body 12 so as to receive and terminate two optical fibers. The elongate body 22 includes at least one pair of retention shoulders 26 and at least one retention cavity 28. The retention shoulders 26 are formed as part of an indent or recess in a channel 30 or keyway within the adaptor 11. The latch retention lugs 18 are each sized and arranged to cooperate and fit with the channel 30 and a retention cavity 28. The retention lugs 18 are accommodated within the channel 30 and on latching are held in place by a retention shoulder 26 within a retention cavity 28.

The latch mechanism of FIGS. 1 and 2 operates in the vertical plane and the latch mechanism is configured for actuation in a direction vertically up the body. In use, the connector 10 is guided and urged towards the adaptor 11, usually by a user during installation or maintenance. The sprung or biased portion of the latch arm 16 contacts the front top surface of the adaptor 11. As the connector 10 is pushed further into the adaptor 11, the latch retention lugs 18 slide along inside the channel or keyway 30. On reaching the standard latch keyway and retention cavity 28 the biased nature of the retention lugs 18 is such that they move out of the channel 30 and spring upward into the retention cavity 28 to create a latch. The retention lugs 18 engage with the retention cavity 28 and bear against retention shoulders 26, to effect the latch that holds the connector 10 and the adaptor 11 together.

The vertical movement of the latch arm 16 in a downward direction will release and remove the retention lugs 18 from the retention cavity 28, thereby unlatching the connector body 12 and so allowing the withdrawal of the connector 10 from the adaptor 11.

Although the above connection is described for a duplex connector and adaptor a similar arrangement and structure has been used for a connector mated with an adaptor with a single latch.

Figure 3:
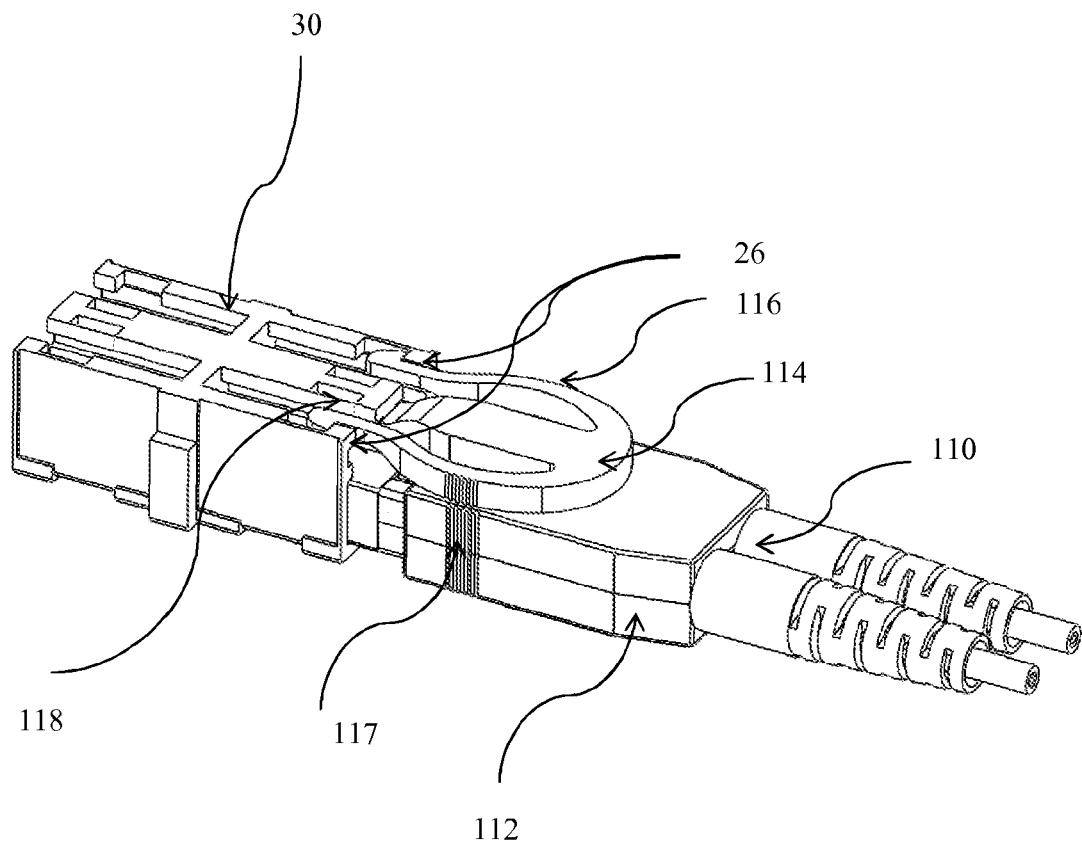
FIG. 3 is a perspective view of a fiber optic connector with a latch mechanism of the present application.

Turning now to FIG. 3 and the latch mechanism of the present invention, the adaptor 11 and the connector body 110 are as described above for a vertical latch and similar numerals will be used for similar parts in the following description.

The latch mechanism 114 comprises a pair of latch members, arms 116, mounted on an upper surface of the body 112. The arms 116 are shaped to curve generally towards one another. Each arm 116 is tapered to finish at a retention face. Each latch arm 116 is also arranged to be sprung or biased horizontally away from the body 112. Each latch arm 116 includes a pair of latch retention lugs 118 extending laterally either side of each of the arms 116. The adaptor 11 to which the connector 110 is to be mated comprises an elongate body 22 bounding an opening 24. The opening 24 corresponds in size and shape to a connector body 112 so as to receive and terminate two optical fibers. The elongate body 22 includes at least one pair of retention shoulders 26 and at least one retention cavity 28. The retention shoulders 26 are formed as part of an indent or recess in a channel 30 or keyway within the adaptor 11. The latch retention lugs 118 are each sized and arranged to cooperate and fit with the channel 30 and a retention cavity 28. The retention lugs 118 are accommodated within the channel 30 and on latching are held in place by a retention shoulder 26 within a retention cavity 28.

The latch mechanism of FIG. 3 operates in the horizontal plane and the latch mechanism is configured for actuation in a direction laterally across the body. The latch mechanism of FIG. 3 is for use instead of the vertically actuated connector described above, the previous latch is removed so as to avoid interfering with the new coupling. In use, the connector 110 will be guided and urged towards the adaptor 11, usually by a user during installation or maintenance. The sprung or biased portion of the latch arm 116 contacts the front top surface of the adaptor 11. As the connector 110 is pushed further into the adaptor 11, the angled faces of the latch retention lugs 118 are urged into the retention cavity 28 and the keyway channel 30 of the adaptor. The retention lugs 118 slide along inside the channel or keyway 30. On reaching the standard latch keyway and retention cavity 28 the biased nature of the retention lugs 18 is such that they move out of the channel 30 and spring outwards into the retention cavity 28 to create a latch. The retention lugs 118 engage with the retention cavity 28 and bear against retention shoulders 26, to effect the latch that holds the connector 110 and the adaptor 11 together.

The latch arms 116 are capable of flexing towards each other under the action of lateral force. The latch arms 116 feature protruding release points 117, at which a user can apply pressure laterally across the body for disengagement. The release and unlatch action lateral movement of the latch arm 116 in an inward direction will release and remove the retention lugs 118 from the retention cavity 28, thereby unlatching the connector body 112 from the adaptor and so allowing the withdrawal of the connector 110 from the adaptor 11.

Figure 4A:
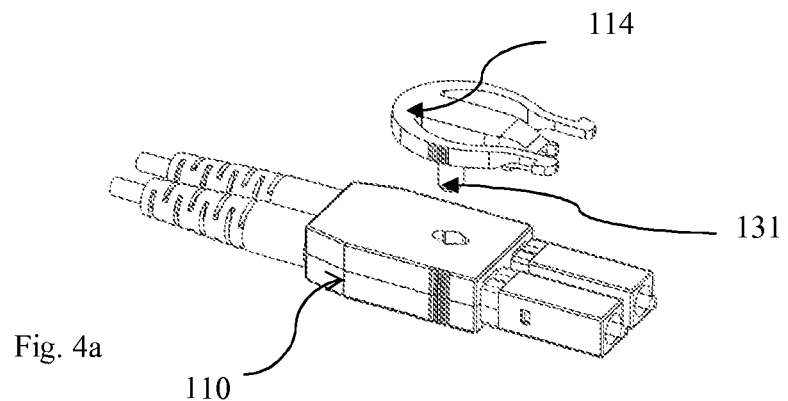
FIG. 4a is a perspective view of the latch mechanism of FIG. 3.
Figure 4B:
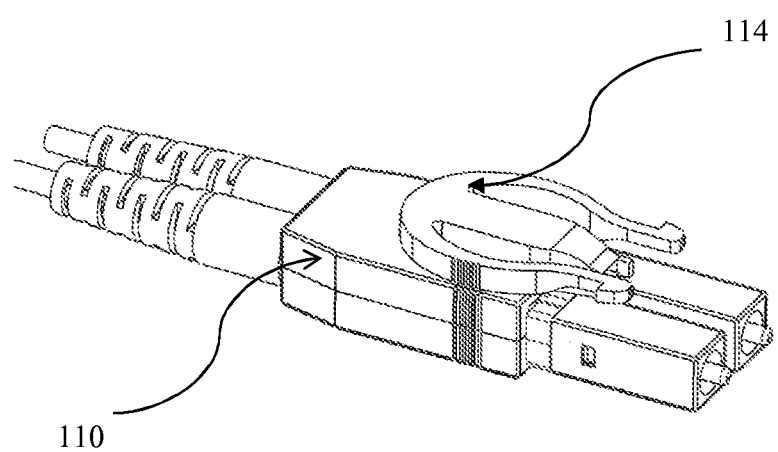
FIG. 4b is a detailed mounted view of the latch mechanism of FIG. 3.
Figure 4C:
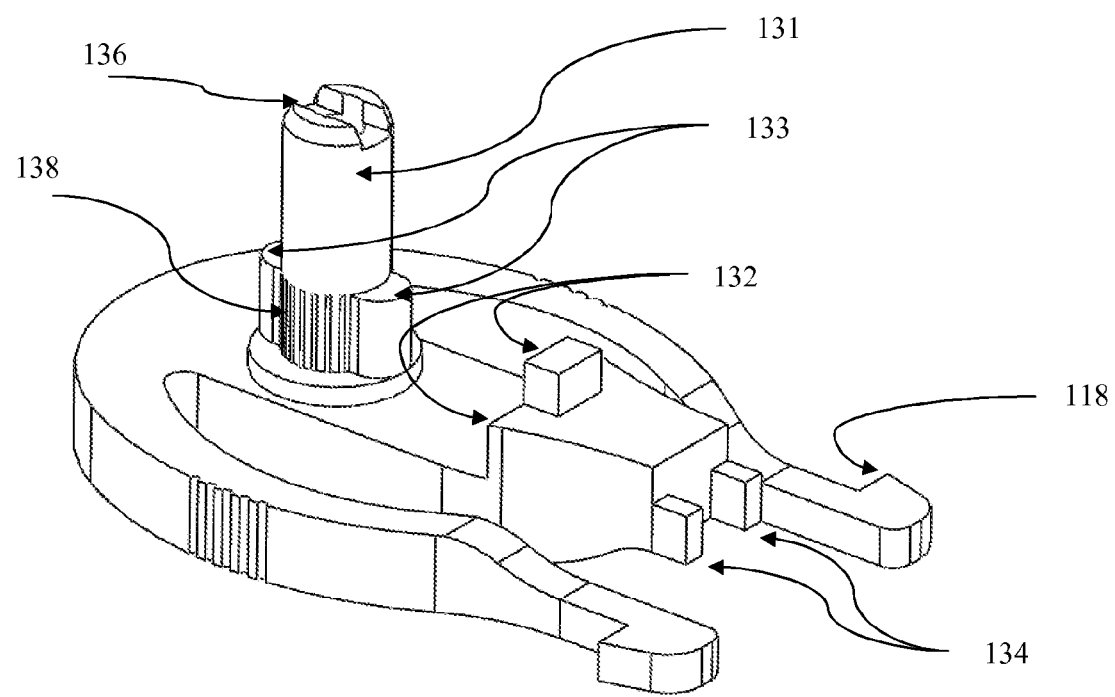
FIG. 4c is a detailed underside view of the latch mechanism of FIG. 3.

FIG. 4 shows details of the mounting and arrangement of the latch mechanism 114 shown in FIG. 3, in order to accommodate the desire to alter the polarity of the patch cord connection. The latch mechanism 114 is configured to be releasably mountable on each of two opposing faces of the connector body 112 with location spigot 131 for mounting to the top or the bottom face of the body 112. Details and features include anti rotation fixings 132, 133 designed to locate and fix the latch mechanism 114 securely within the connector.

Further details include the two central shoulders normally used for standard connector are left clear. This is achieved through the high density switchable horizontal latch being mounted centrally in the duplex connector and having symmetry about the central axis.

To achieve symmetry and prevent rotation of the high density switchable horizontal latch, the latch has been designed with a primary key feature 136 on the location spigot 131. This locates into the corresponding keyway feature in the connector body. Precise alignment is achieved via the major anti-rotation feature 132 which locates onto the front edge of the connector body and down through the two connector channels. This feature adds strength to the latch body.

To further strengthen the coupling between the connector 110 and adaptor 11 when connected, the latch 114 has a rigid central feature with two protruding keys 134. This set of central location features 134 on the latch mechanism are accommodated in between the central portion of the adaptor 11, and locate into the two central, now redundant, keyways. Overall this arrangement increases support and rigidity in the connector/adaptor combination.

The high density switchable horizontal latch is retained in the body simply by using a coarse spline feature 138 to create resistance when inserting into the main connector body. Removal is from the base side and is achieved by inserting a screwdriver blade into the keyway on the key 136 of spigot 131, or equivalent pushing out the latch 114. The latch 114 is designed as a disposable item of limited use and hence will not be repeatable switched. It is likely that at best it will be fitted twice.

Figure 5:
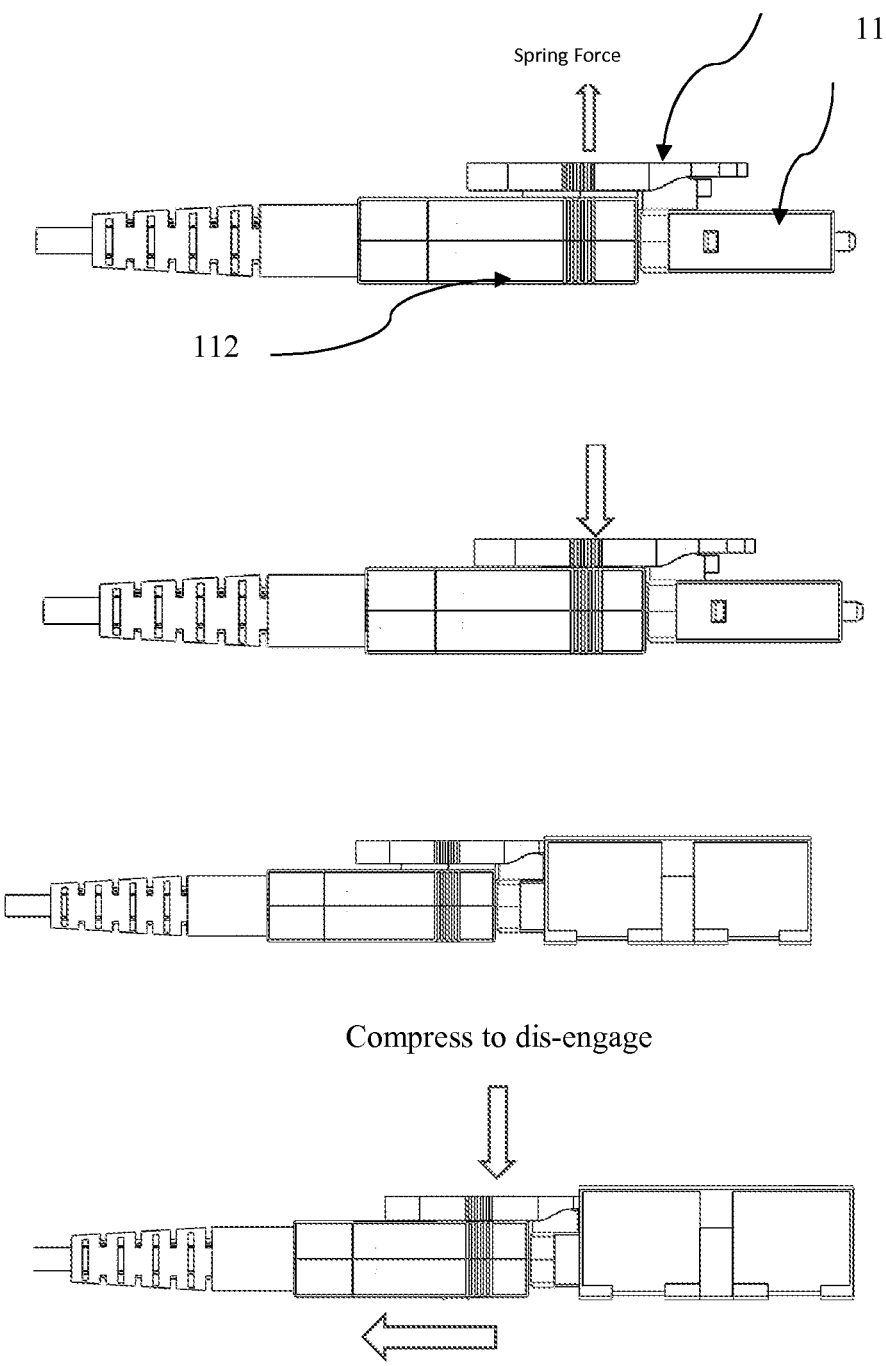
FIG. 5 is a horizontal latch, actuated vertically.

In a second embodiment illustrated in FIG. 5, a horizontal latch is sprung in the vertical plane allowing the known horizontal connection to be maintained but with release in the vertical direction. This means the connection and disconnection is effected through depression of the latch in the vertical plane. The latch mechanism 114 is located above the connector 112 and is raised in a free and disengaged position. The latch mechanism 114 is compressed in order to disengage the latch portions such as the retention lugs 118 from the adaptor 11.

Figure 6:
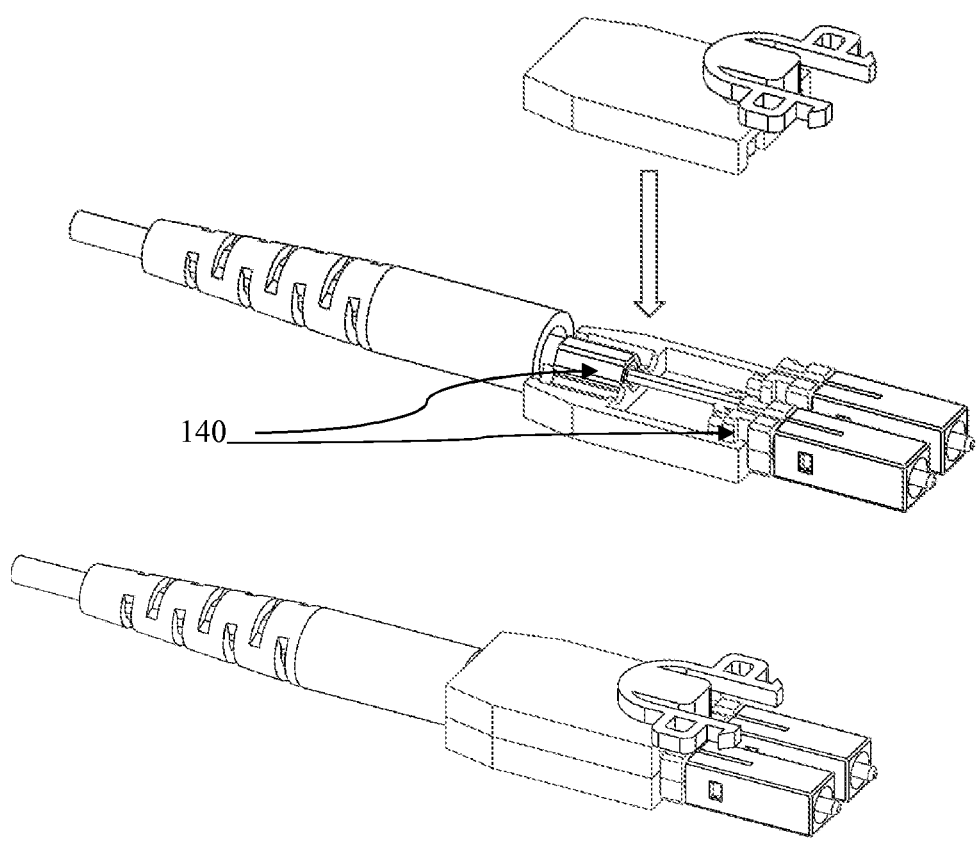
FIG. 6 is a useful design, with multiple cable variants; and a common connector body.
Figure 7:
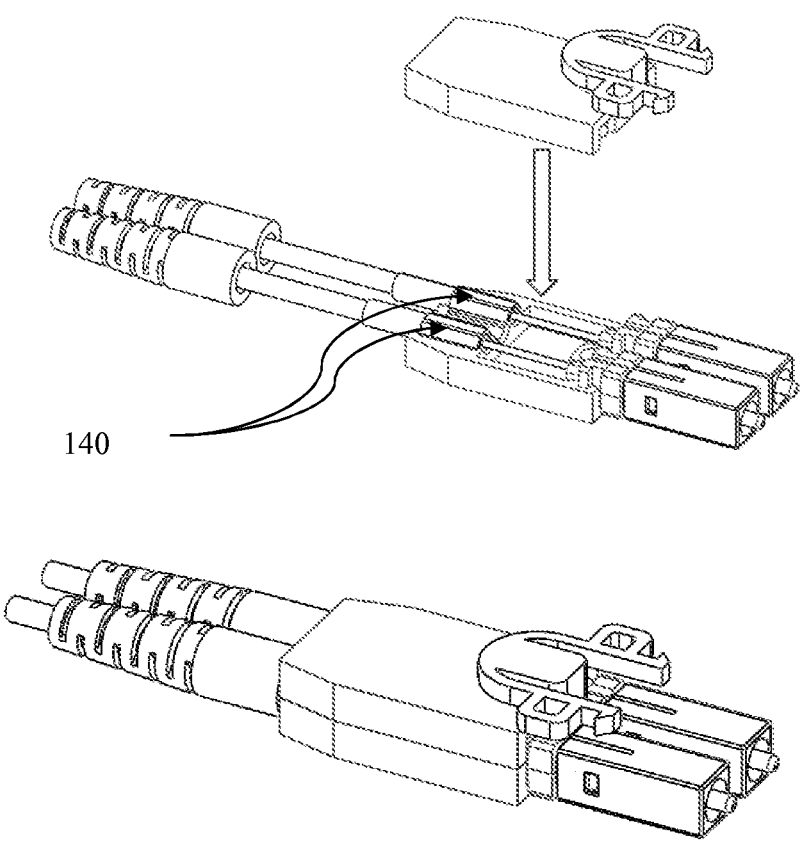
FIG. 7 is a useful design, with a duplex cable variant and fiber crimping for location of the components of the cable within the adaptor.
Figure 8:
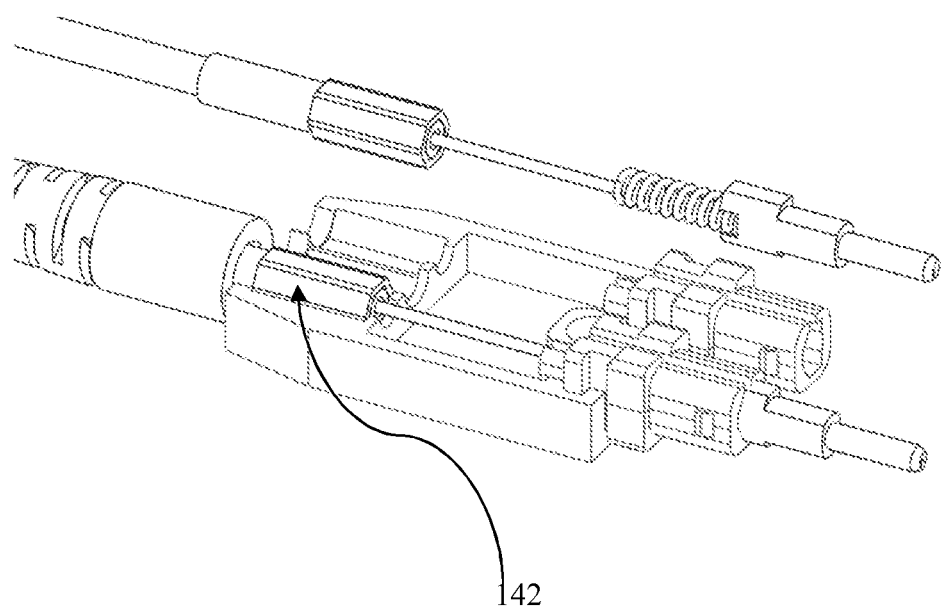
FIG. 8 is an embodiment utilizing a venturi slot and fiber crimping for location of the components of the cable within the adaptor.

A further embodiment is one having multiple cable variants within one common connector body. The features of the multiple cable are achieved through three hexagonal location features 140 inside the connector body as illustrated in FIGS. 6 and 7. The crimp is located in the central hexagonal profile.

In a further embodiment a universal design duplex cable is provided utilizing a venturi slot and fiber crimping for location of the components of the cable within the adaptor. The adapter venturi slot, allows the pre build of a fiber with a ferrule and then just the slotting of the package into the adaptor. The crimp 142 is located on the outer portion of hexagonal profiles.

Figure 9A:
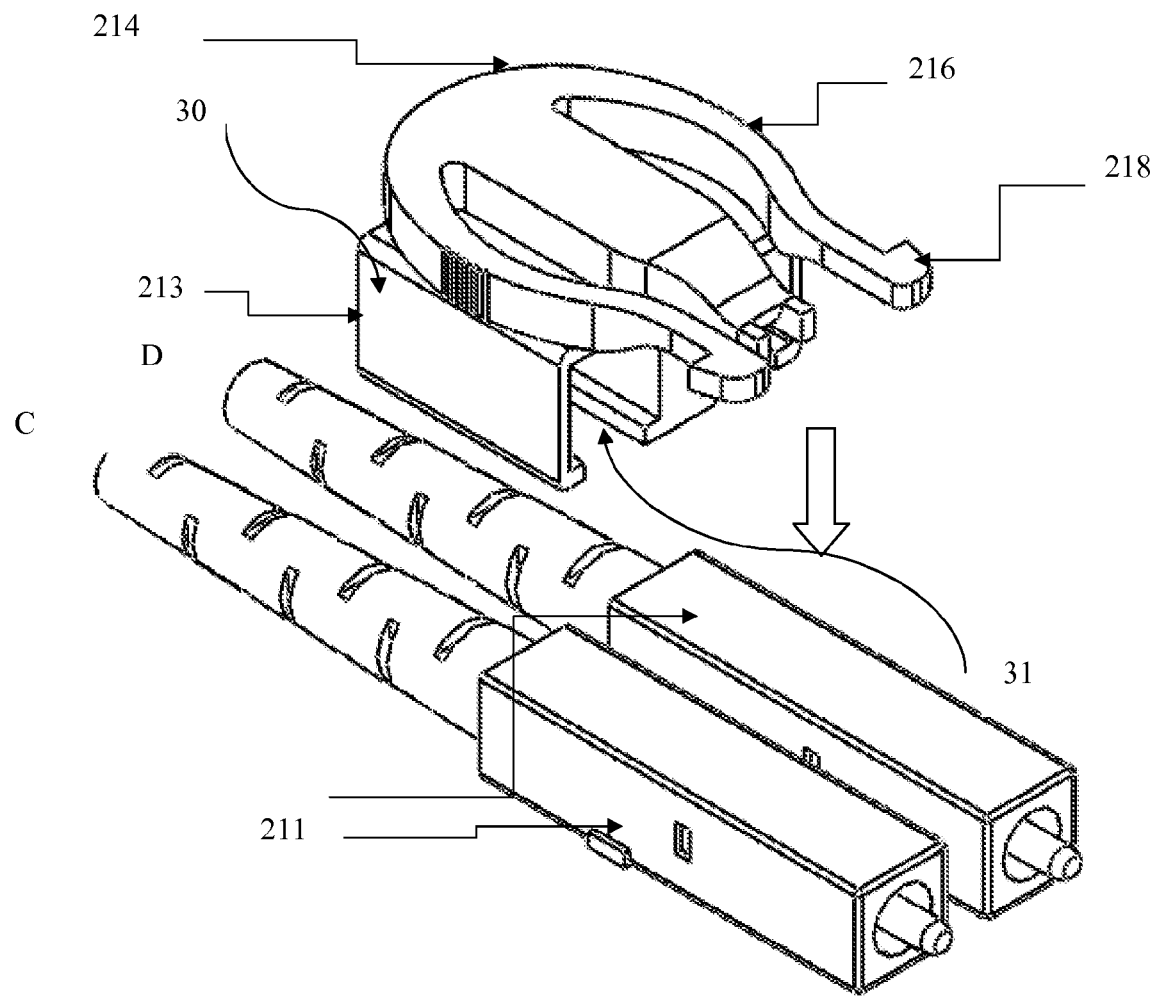
FIG. 9a is a perspective view of an alternative connector with a latch mechanism according to the present application.
Figure 9B:
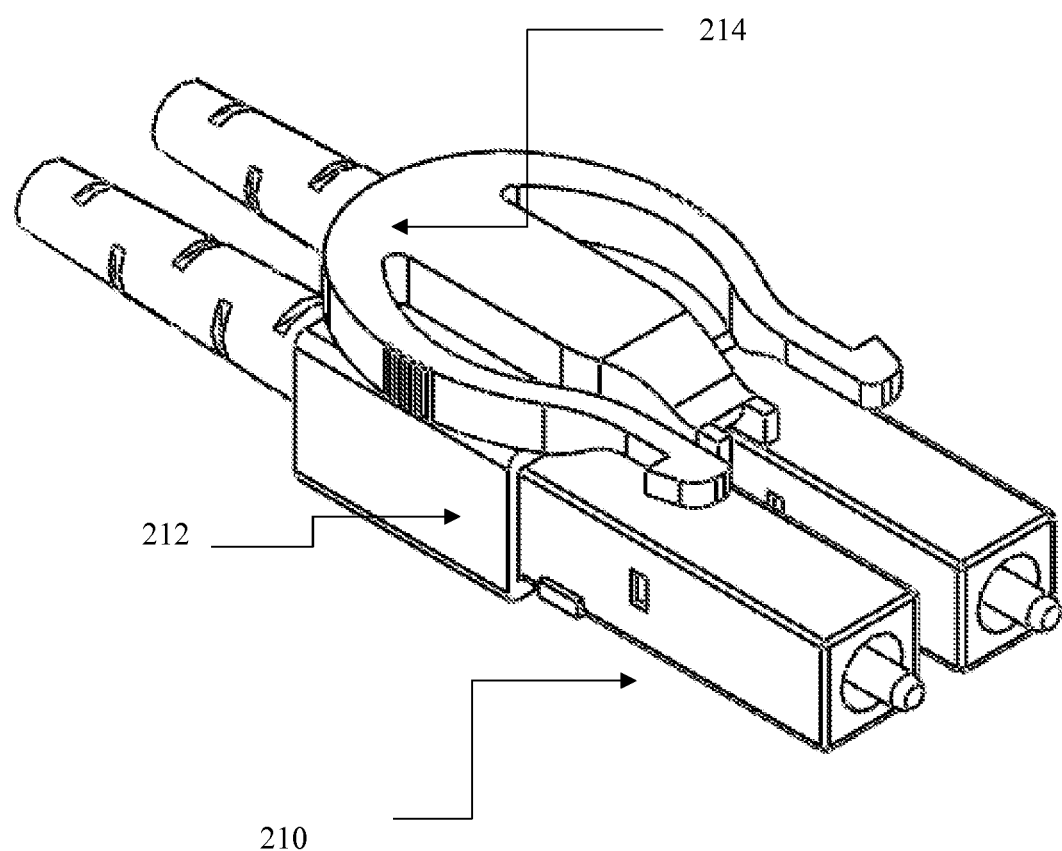

In a further embodiment illustrated in FIGS. 9a and 9b the connector 210 is shown terminating or receiving two optical fibers C, D. The connector 210 comprises two single units 211 forming the connector body 212 along with a brace member 213. The brace member 213 is arranged so as to clamp or fix the single units 211 also known as simplex connectors, together. The brace member 213 enables a simplex connector to be used in a duplex application. The brace member 213 comprises an elongate body 30 enclosing an opening 31. The opening 31 is of a size corresponding to the outer dimensions of the simplex connectors 211. In use the latch 214 is fitted to and arranged on the brace member 213 and the brace member 213 is slid or clipped over the simplex connectors 211 to secure the connector unit together. FIG. 9b shows the braced connector unit 210 with the horizontal latch mechanism 214. The horizontal latch feature has been described above and the functionality and features of the connector unit 210, latch 214 and retention lugs 216 are similar to those described above with reference to FIGS. 4 and 5. The operation of the braced connector unit 210 with the adaptor 11 will be as described above.

There have been described and illustrated herein several embodiments of a fiber optic connector. While particular embodiments of the invention have been described, it is not intended that the invention be limited thereto, as it is intended that the invention be as broad in scope as the art will allow and that the specification be read likewise. For example, there may be different shapes of fixing and orientation. There may be any number of mounting sockets, the location and orientation of the mounting sockets can be varied. The latch members and the Latch member arm components may be of any one of a variety of shapes; curved, tapered, blocked. Other material combinations may be envisaged. One or more connectors may be utilized and different connectors may be envisaged. It will therefore be appreciated by those skilled in the art that yet other modifications could be made to the provided invention without deviating from its spirit and scope as claimed.

What is claimed is:
1. A fiber optic connector arranged to be releasably connected to a fiber optic adaptor having two sockets, the fiber optic connector comprising:
    a body configured to receive and terminate two optical fibers;
    a latch mechanism provided on the body, the latch mechanism being configured for releasable engagement with each of the two sockets of the fiber optic adaptor, and the latch mechanism being configured for actuation in a direction laterally across the body; and cooperating structural elements on the latch mechanism and two opposing faces of the body for releasably mounting the latch mechanism on each of the two opposing faces of the body.

2. A fiber optic connector as claimed in claim 1, wherein: the latch mechanism comprises a pair of latch members, each latch member configured to releasably engage with one side of a respective one of the two sockets of the fiber optic adapter.

3. A fiber optic connector as claimed in claim 1, wherein: the latch mechanism comprises a pair of latch members, each latch member comprises a retention face arranged to cooperate with a portion of a keyway of a respective socket of the fiber optic adaptor.

4. A fiber optic connector as claimed in claim 1, wherein: the latch mechanism comprises a pair of latch members, each latch member comprises a retention face shaped to latch and engage with a portion of a keyway of the respective socket of the fiber optic adaptor.

5. A fiber optic connector as claimed in claim 1, wherein: the latch mechanism comprises a pair of latch members and the connector further comprises a location member provided between the pair of latch members, the location member arranged to engage with a central portion of the fiber optic adaptor between the two sockets of the fiber optic adaptor, to thereby locate and retain the connector in engagement with the fiber optic adaptor.

6. A fiber optic connector as claimed in claim 1, wherein: the latch mechanism comprises a pair of latch members, each latch member comprises an arm having a generally curved shape, the arms being arranged to curve generally towards one another, each arm being tapered to finish at a retention face.

7. A fiber optic connector as claimed in claim 1, wherein: the latch mechanism comprises a pair of latch members, the latch members are arranged to flex towards each other under the action of lateral force.

8. A fiber optic connector as claimed in claim 4, wherein: the retention face of each latch member is configured to be urged out of contact with a portion of a keyway of the respective socket of the fiber optic adaptor under the action of a lateral force.

9. A fiber optic connector as claimed in claim 4, wherein: each latch member comprises a release portion located on a side of the latch member, the release portion is responsive to an external lateral force, so as to urge each latch member and its retention face towards each other.

10. A fiber optic connector as claimed in claim 1, wherein: the cooperating structural elements include a mounting spigot including one or more anti rotation side flanges as well as first and second mounting sockets provided on each of the two opposing faces of the body, wherein the mounting spigot and side flange are configured for selectable location in the first and second mounting sockets, and wherein the mounting spigot and said flange are configured to engage with the respective mounting socket to secure the latch mechanism to the body and hinder rotation of the connector.

11. A fiber optic connector as claimed in claim 1, wherein: the latch mechanism is further configured for actuation in a direction towards the body, the latch mechanism being movable between an engagement position at a first separation from the body and a release position at a second, smaller separation from the body in which the latch mechanism is disengaged from the sockets of the fiber optic adaptor.

12. A fiber optic adaptor unit comprising:
a fiber optic adaptor having two sockets; and
a fiber optic connector arranged to be releasably connected to the fiber optic adaptor, the fiber optic connector including a body configured to receive and terminate two optical fibers, a latch mechanism provided on the body, and cooperating structural elements on the latch mechanism and two opposing faces of the body for releasably mounting the latch mechanism on each of the two opposing faces of the body;
wherein the latch mechanism is configured for releasable engagement with each of the two sockets of the fiber optic adaptor, and the latch mechanism is configured for actuation in a direction laterally across the body.

13. A fiber optic connector arranged to be releasably connected to a fiber optic adaptor having two sockets, the fiber optic connector comprising:
a body configured to receive and terminate two optical fibers; and
a latch mechanism provided on the body, the latch mechanism being configured for releasable engagement with each of the two sockets of the fiber optic adaptor, and the latch mechanism being configured for actuation in a direction laterally across the body;
wherein the latch mechanism comprises a pair of latch members, each latch member including an arm having a generally curved shape, the arms being arranged to curve generally towards one another, each arm being tapered to finish at a retention face.

* * * * *